(12) United States Patent
Nilsen et al.

(10) Patent No.: US 7,749,459 B2
(45) Date of Patent: Jul. 6, 2010

(54) ELECTROSTATIC COALESCER DEVICE AND USE OF THE DEVICE

(75) Inventors: Pål Jahre Nilsen, Boedalen (NO); Gorm Sande, Nesbru (NO); Wojciech Piasecki, Cracow (PL)

(73) Assignee: Aibel AS, Billingstad (NO)

( * ) Notice: Subject to any disclaimer, the term of this patent is extended or adjusted under 35 U.S.C. 154(b) by 1064 days.

(21) Appl. No.: 10/493,830

(22) PCT Filed: Nov. 6, 2002

(86) PCT No.: PCT/IB02/04657

§ 371 (c)(1),
(2), (4) Date: Oct. 25, 2004

(87) PCT Pub. No.: WO03/039706

PCT Pub. Date: May 15, 2003

(65) Prior Publication Data

US 2005/0040045 A1    Feb. 24, 2005

(30) Foreign Application Priority Data

Nov. 7, 2001    (NO) .................................. 20015454

(51) Int. Cl.
*B01J 19/08*    (2006.01)
(52) U.S. Cl. ........................ 422/186; 204/660; 204/667; 204/671; 204/268; 204/563; 210/243; 210/748
(58) Field of Classification Search ................. 422/186; 204/268, 272, 563, 570, 660–671; 210/243, 210/748
See application file for complete search history.

(56) References Cited

U.S. PATENT DOCUMENTS

| 3,577,336 A | * | 5/1971 | Shirley ........................ 204/665 |
| 4,469,582 A | | 9/1984 | Sublette et al. |
| 4,722,787 A | * | 2/1988 | Fombarlet et al. ........... 210/209 |
| 4,919,777 A | | 4/1990 | Bull |
| 5,739,986 A | * | 4/1998 | Van Vlerken et al. ..... 360/281.8 |
| 6,136,174 A | * | 10/2000 | Berry et al. .................. 204/671 |
| 6,692,627 B1 | * | 2/2004 | Russell et al. ............... 204/554 |
| 6,730,205 B2 | * | 5/2004 | Holland ....................... 204/557 |

FOREIGN PATENT DOCUMENTS

| WO | WO 99/62611 A1 | 12/1999 |
| WO | WO 01/85297 A1 | 11/2001 |

* cited by examiner

*Primary Examiner*—Alexa D Neckel
*Assistant Examiner*—Xiuyu Tai
(74) *Attorney, Agent, or Firm*—Venable LLP; Eric J. Franklin (57) ABSTRACT

A device, located in a vessel having an inlet and at least one outlet, through which a mixture of fluids flows, for promoting electrostatic coalescence of a first conductive fluid emulsified in a second fluid. The device includes a number of tubular electrostatic coalescer elements extending in the flow direction which are arranged in a matrix arranged over the cross sectional area of the vessel, and an applicator operative to apply an electrical field to the fluids flowing through the coalescer elements.

14 Claims, 8 Drawing Sheets

ELECTROSTATIC COALESCER DEVICE AND USE OF THE DEVICE

CROSS-REFERENCE TO RELATED APPLICATIONS

This application claims priority to Norwegian patent application No. 20015454 filed Nov. 7, 2001 and is the national phase under 35 U.S.C. §371 of PCT/IB02/04657 filed Nov. 6, 2002.

TECHNICAL FIELD

The present invention relates to an electrically energised device for use in the separation of a first conductive fluid, emulsified in a second fluid. The invention finds its main application in the oil industry. It is particularly advantageous in off-shore applications in which equipment is arranged for the purpose of promoting or effectuating a pre-separation of water from oil, or a water droplet enlargement, before an extracted emulsion comprising oil and water is further conducted to a subsequent settling tank for gravitational settling.

BACKGROUND OF THE INVENTION

Fluids produced from an underground formation, is usually a three-phase mixture of water, oil and gas, in which at least some of the water is emulsified in the oil. This mixture of fluids is usually separated into its phases downstream of the wellhead, in order to be deliverable to pipelines for further distribution. A possible method for performing such a separation is to use a three-stage process, with two gravity separator tanks followed by a last separator tank including an electrostatic coalescer. The gravity separators usually include a flow straightener at the inlet. The purpose of the flow straightener is two-fold; to equalize the flow regime across the section of the tank, and to affect a mechanical coalescing of water droplets prior to the separation by gravity, in order to increase the efficiency of the separation process.

The problem with this multistage process is that separation is most effective at the first stage, where there is a large percentage of water to be separated out. At the last stage, the percentage of water is relatively low, which means that an electrostatic coalescer must be introduced in this gravity separator tank.

Still, the efficiency is low, which means that the fluids have to remain in the separator tank for a long time in order to allow the phases to separate out. Thus, the tank has to be large, e.g. about four meters in diameter and 20 meters long. It is inconvenient to use a tank of this size at the production site, especially offshore where the available space is limited.

Prior Art

U.S. Pat. No. 4,469,582 describes an electrically enhanced inclined plate separator in a downstream compartment connected to an electrical system to generate electric fields within the passages of the separator to coalesce and separate a polar is liquid (water) from a non-polar liquid (oil). The separator generally consists of an array of parallel flat, or corrugated, plates (electrodes) through which the processed mixture of liquids passes. Each plate is made of two sections. The first section is made of en electrically conductive material. The downstream, second section is made of a non-conductive material.

U.S. Pat. No. 4,919,777 describes a treater for electrostatic/mechanical separation of brine from oil during longitudinal flow through a horizontally elongate tank, wherein coalescer elements are provided for enhancement of the de-emulsification process. The emulsion is directed through electrical fields where the brine droplets take on an electrical charge, then moved through an electrically grounded coalescing element comprising a multiplicity of longitudinally-extending downwardly-inclined open-ended tubes arranged in a bundle-fashion.

A drawback of the separators disclosed in U.S. Pat. Nos. 4,469,582 and 4,919,777 is that they both use bare electrodes. A coalescer with bare electrodes in contact with the fluids would not withstand the condition of being flooded with water. The saline water is conductive and will short-circuit the electrodes, rendering the electrical system inoperative. With bare electrodes, water content of 10% is normally regarded as the limit. Also, such bare electrodes would be subjected to corrosion due to the emulsion. Thus, these can only be used late in a chain of settling tanks, where the water content has been brought down below the 10% limit.

BRIEF DESCRIPTIONS OF THE INVENTION

It is an object of the present invention to provide a device in a separator vessel, such as a gravity separator tank, that enhances the separation of the individual phases is in a mixture of fluids, and at the same time to ensure a proper plug-flow in the separator(s).

Another object of the invention is to provide such a device that efficiently can coalesce a conductive fluid in an emulsion, such as water in a water-oil emulsion.

Another object of the invention is to provide a device that contributes to a reduction of the overall size of the separator vessel, and/or ultimately can reduce the number of vessels in a multi-stage process.

Still another object of the invention is to provide a device that easily may be installed in existing gravity separators, i.e. through the manhole.

These objects are achieved by a device and arrangement employing the device.

In essence, the invention consists of a combination of a flow straightener and a multitude of coalescer elements.

Expressed in another way, the invention comprises a stack of coalescer elements which at the same time work as a flow straightener.

BRIEF DESCRIPTION OF THE DRAWINGS

The invention will now be described in detail with reference to the appended drawings, in which.

DETAILED DESCRIPTION OF THE INVENTION

Figure 1:
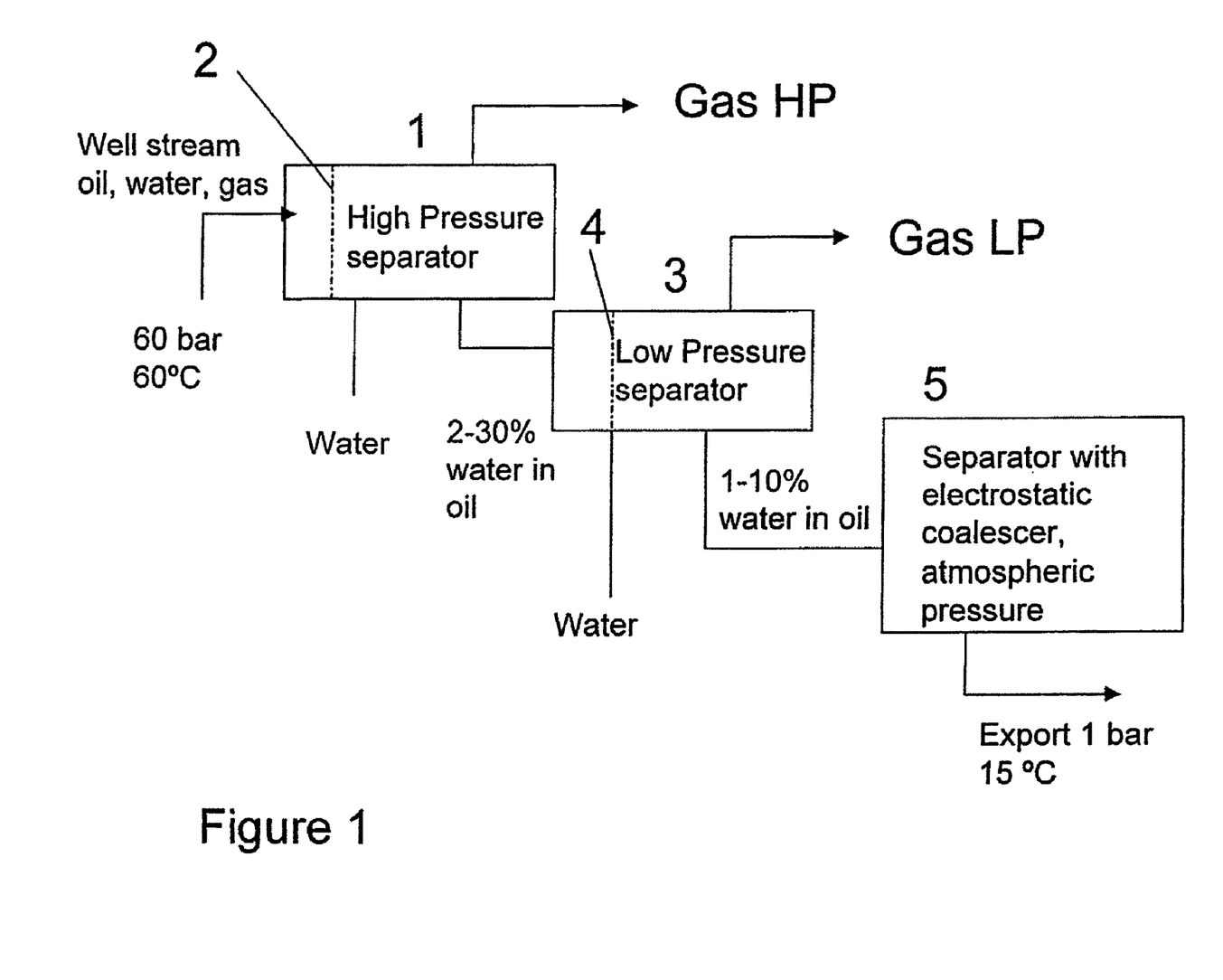
FIG. 1 gives a schematic overview of a three-stage separation process, according to prior art.

FIG. 1 is a schematic drawing of a separator system, normally placed downstream the wellhead. Some of the requirements for such a separator system are to bring down the pressure and temperature of the oil production stream from the well (typically 60 bar and 60° C., respectively) to typically 1 bar and 15° C. for export. In addition, the exported oil should contain less than 0.5% water. To meet these requirements, a three-stage process can be used, comprising three gravity separator tanks 1, 3, 5. A well stream containing oil, water and gas is entering the first separator 1. The separator 1 has a flow straightener 2 at the inlet. The flow straightener acts to ensure proper plug-flow in the main body of the tank, i.e. to distribute and homogenise the multi-phase flow over the cross section of the tank. The flow straightener is normally a perforated plate with a certain pressure loss to evenly distribute the volume flow. Typically, the perforation is 15-25% of the cross sectional area with a diameter of the holes in the region 10-30 mm. It is common to use two such plates, with the holes somewhat displaced radially. The rather narrow holes will introduce some turbulence in the flow. This will act to coalesce the water droplets and thus will speed up the subsequent separation of the fluids. The fluids leaving the first separator will typically contain about 2-30% water emulsified in the oil.

The next separator 3 is of a similar construction to the first separator 1, and will bring down the water content to approximately 1-10%.

It now becomes harder to remove the remaining water and the separation process in the last separator 5 is therefore slow, typically with the fluids retained in the tank for about 10 minutes, compared to about 3 minutes in the previous separators.

Figure 2:
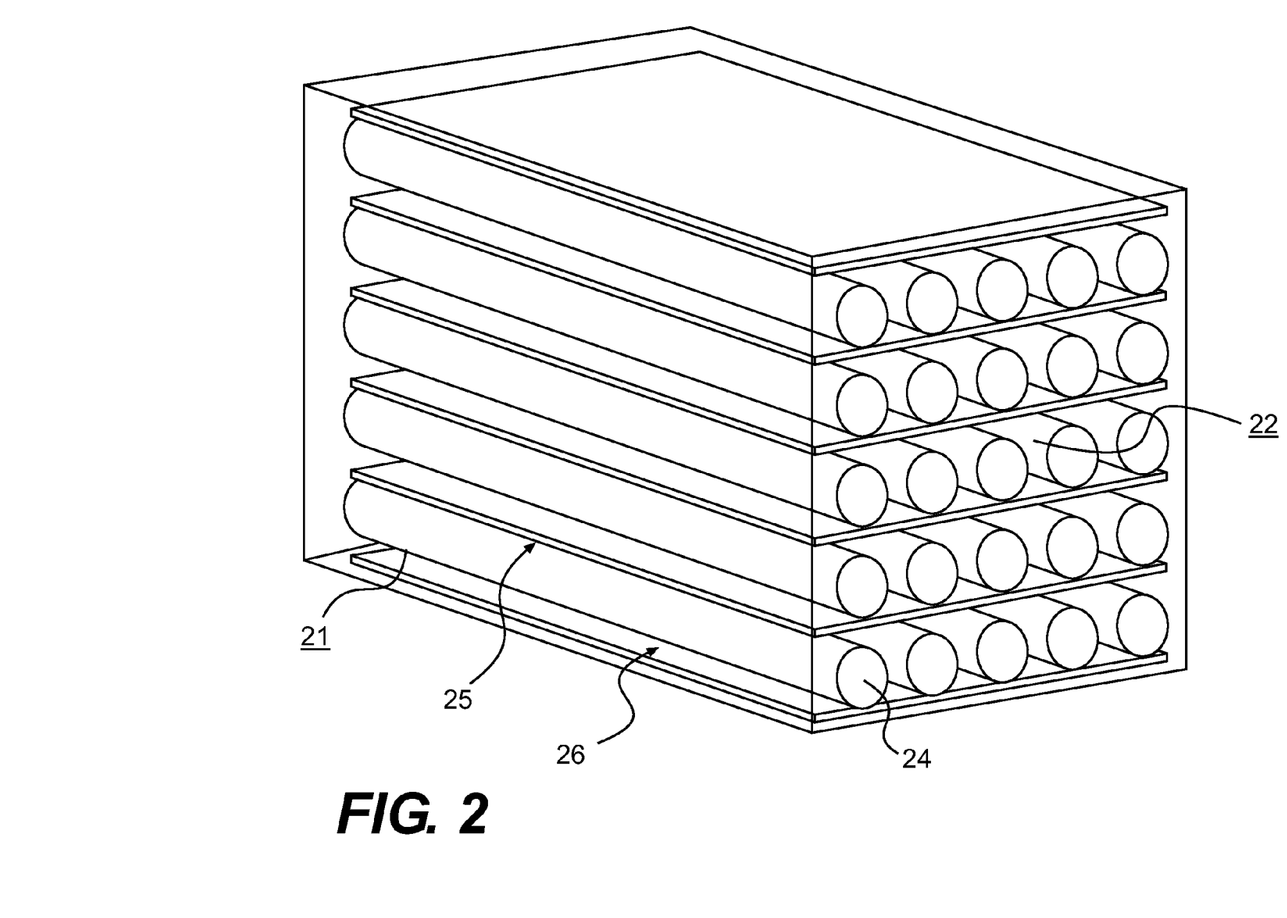
FIG. 2 shows an embodiment of the invention.
Figure 3:
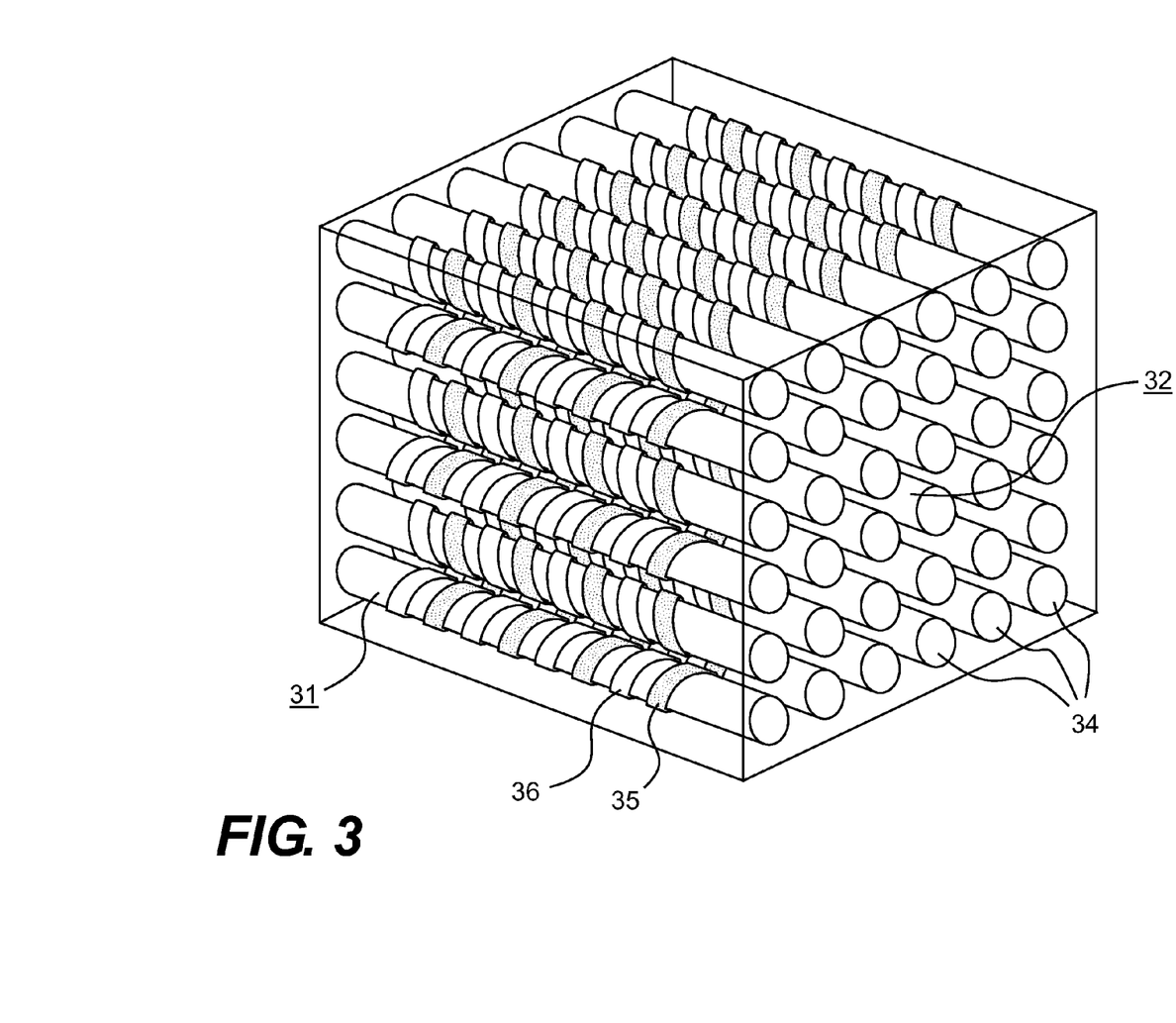
FIG. 3 shows another possible embodiment of the present invention.

The idea behind the present invention is to combine the features of a flow straightener with the inline electrostatic coalescer. This is done, as shown in FIGS. 2 and 3, by applying a stack of individual electrostatic coalescers, each comprising a tubular channel through which the emulsion is to flow, and with external electrodes on the outside of the channels for applying an electrical field to the emulsion, instead of the traditional perforated plates for flow straightening. Thus, the separation will be enhanced in addition to ensure proper plug flow in the separators. This new flow straightener/coalescer is installed in the first gravity separators, 1, 3 preferably at their inlets. Here, the effect of the separation process is at the greatest, and the inventive flow straightener/coalescer will improve the effectiveness of these separators 1, 3. The effectiveness of said separators can thus substantially be improved so that the oil leaving the second separator contains less than 0.5% water, i.e. meets the requirements of the customers. Then, the last separator 5 may ultimately be dispensed with.

FIG. 2 shows a first embodiment of the inventive combined coalescer and flow straightener. The device comprises a number of small-scale coalescer elements 21 organised in a matrix over the cross section of the separator or vessel. Each coalescer element 21 comprises a preferably tubular channel 24 made of an insulating material and a first electrode 25 and a second electrode 26 attached to the channel 24 on the outer surface thereof. The wall of the channel 24 separates the electrodes 25, 26 from immediate contact with the emulsion or fluids flowing through the channel. The individual channels define rows, and a number of electrodes are arranged as sheets or plates separating adjacent rows. Thus the electrodes 25 and 26 are common for all channels in each row, and each electrode is also common for the rows on opposite sides thereof. The first electrodes 25 are of opposite polarity compared to the second electrodes 26.

FIG. 3 shows an alternative embodiment of the inventive device, in which each separate channel 34 is surrounded by a pair of helical winded electrodes 35, 36, having opposite polarity as disclosed in the co-pending Norwegian patent application no. 2000 2383. However, while this embodiment has proved to be more efficient than the first embodiment in separating the fluids, this is a more complicated design to implement, and the first embodiment will thus be the preferred embodiment.

One additional requirement of the inventive device is that it should withstand both being flooded with water, i.e. being partly or completely filled with a water continuous phase, and going dry, i.e. being partly or completely filled with gas. To meet this requirement, insulated electrodes must be used. In the embodiments shown in FIGS. 2 and 3, the electrodes are external to the tubes, and thus no problems arise for an emulsion with high water content. As mentioned earlier, the invention is intended to be installed upstream in the separation process, even in the first separator tank where the water content is high. Then it will be a prerequisite to use insulated electrodes in order to cope with emulsions containing in excess of 10% water.

Figure 4:
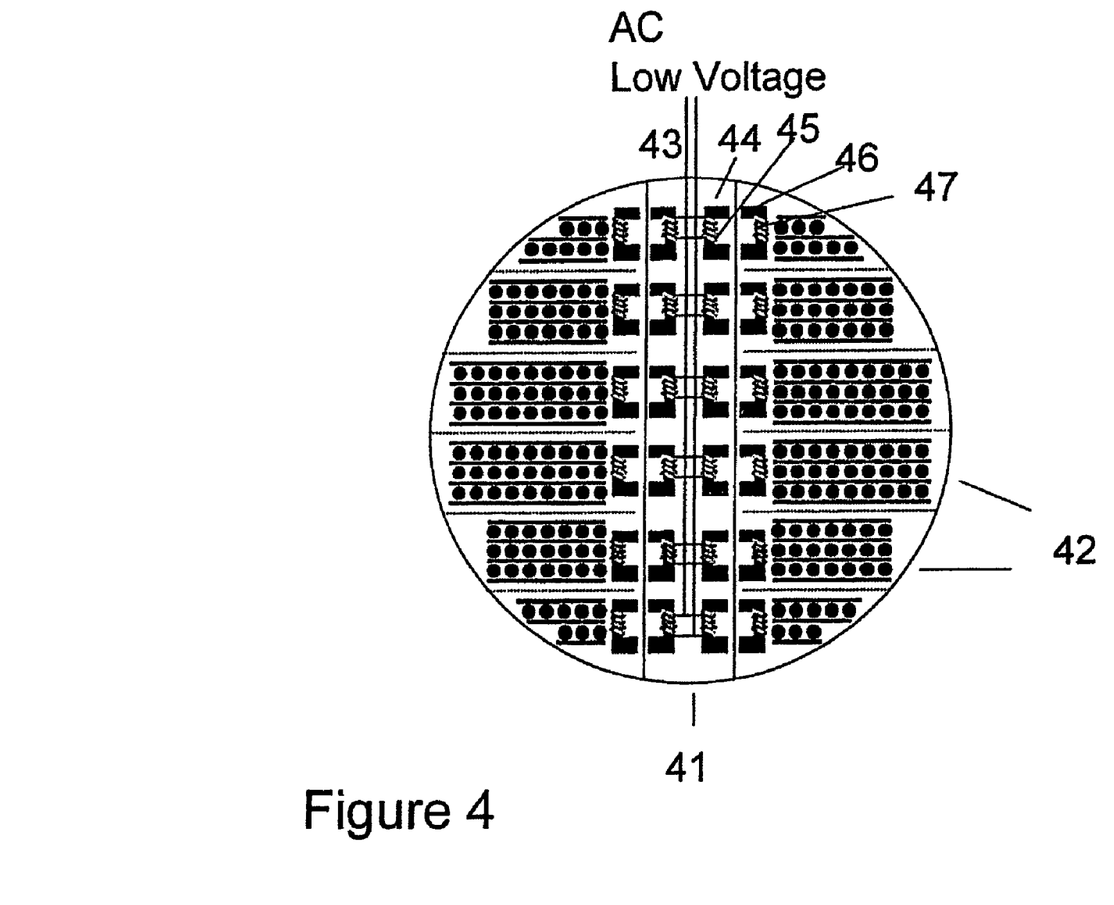
FIG. 4 shows an embodiment of the invention using inductive energy transfer to the individual coalescer elements.

The inventive device is intended to be used in offshore installations both topside and subsea, i.e. at the seabed. In these harsh environments, it is preferred to feed the device from a low-voltage power source. The low-voltage line, typically 400 volts AC, is conducted through the wall of the vessel into a central module 41, 57 with one or more integrated transformers, see FIGS. 4 and 5. The matrix of coalescer elements are preferably made as coalescer modules. In cases where the inventive device is applied to the retrofit market, the size of each module must not exceed the size of the manhole of an existing separator tank.

In the present invention, the electrical energy is transferred without galvanic contact between the central module 41, 51 and the corresponding coalescer modules 42, 52 in order to energise the electrodes of the coalescer modules. In the embodiment shown in FIG. 4, inductive coupling is used to energise the coalescer electrodes. The central module 41 comprises a number of primary transformer windings 45 on half cores 44. Adjacent to the central module 41 are mounted a number of coalescer modules 42, each including a corresponding secondary winding 47 on a half core 46. Each half core 44, 46 is mounted near the wall of the respective module 41, 42, protected by an insulating layer. The coalescer modules 42 are mounted on the central module 41 in the separator vessel, and half cores 44, 46 and windings is 45, 47 will together form a complete transformer. The transformers are fed with low voltage AC from the line 43 and supply the electrodes in the coalescer modules 42 with high voltage. This inductive coupling allows all those parts of the construction that are carrying electricity to be completely embedded in oil/water compatible insulated materials and thus protect them against the harsh environment present in the separator. The modules can e.g. be moulded in epoxy. The choice of proper materials for this application is further described in NO 2000 2383.

Figure 5:
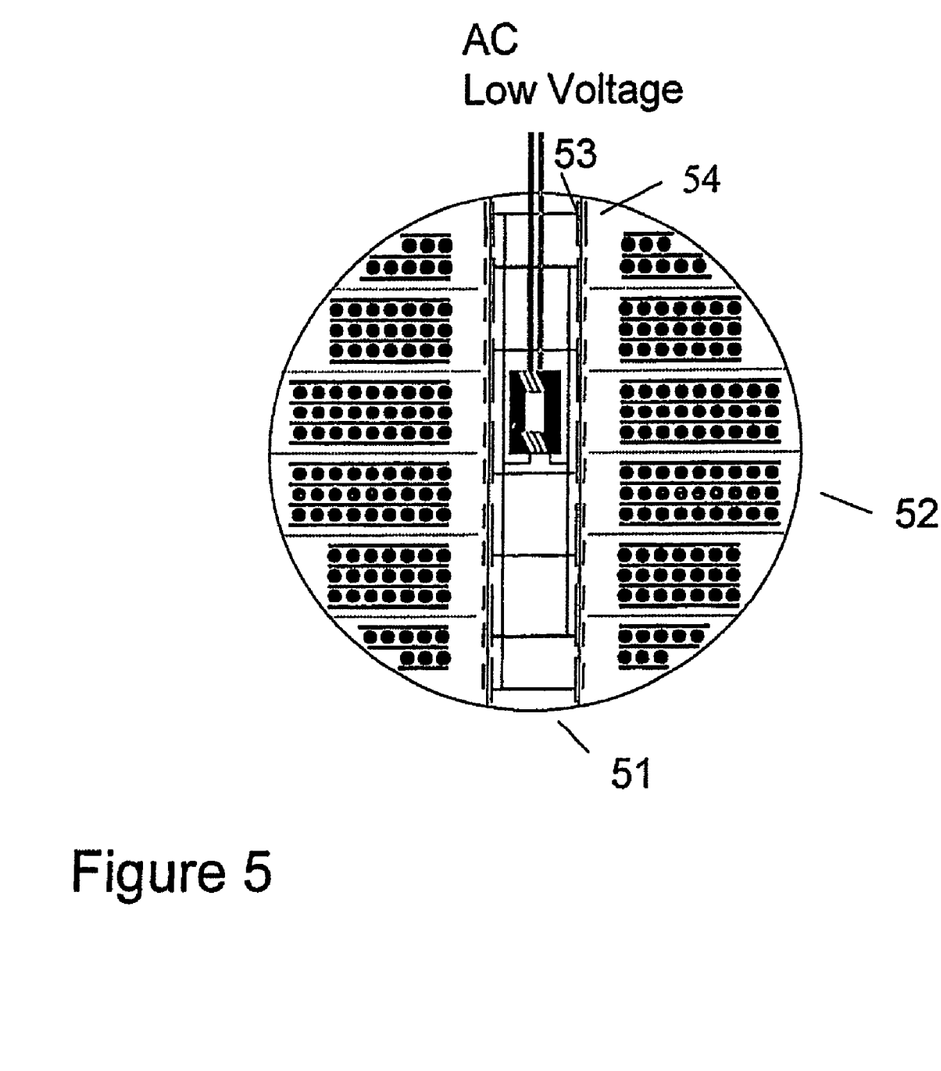
FIG. 5 shows another embodiment of the invention using capacitive energy transfer.

Another way of achieving the energy transfer without galvanic contact between the central module and the neighbouring electrode modules is to use capacitive coupling, see FIG. 5.

The embodiment shown in FIG. 5 comprises a central module 51 surrounded by coalescer modules 52. The central module 51 includes a transformer fed with low voltage AC.

High voltage from the transformer secondaries is fed to plates 53 located parallel to and in close proximity to the module wall.

In the coalescer modules 52, corresponding plates 54 are located parallel to the wall adjacent to the central module 51. Pairs of plates 53, 54 located in the central module 51 and in the coalescer modules 52 form capacitors, allowing energy transfer from the central module 51 to the electrodes in the neighbouring coalescer modules 52. However, as in the case of the inductive coupling there are many ways known to those skilled in the art to technically achieve the capacitive energy transfer between the central module and the neighbouring coalescer modules. The one shown in FIG. 5 is just one example presented to reveal the concept of using capacitive coupling to allow contactless transfer of the energy required to energise the electrodes in the coalescer modules.

Yet another way of supplying the electrodes of the coalescer elements being arranged in one or more modules with high voltage is to mould a complete transformer into each individual coalescer module, in this preferred embodiment the transformer of the module has a separate low voltage winding terminal accessible from the outside and at the same time the high voltage secondary winding insulated from the fluids.

In the embodiments shown in FIGS. 2-5, each individual channel can typically be 5-30 mm in diameter and 100-500 mm in length.

Figure 6:
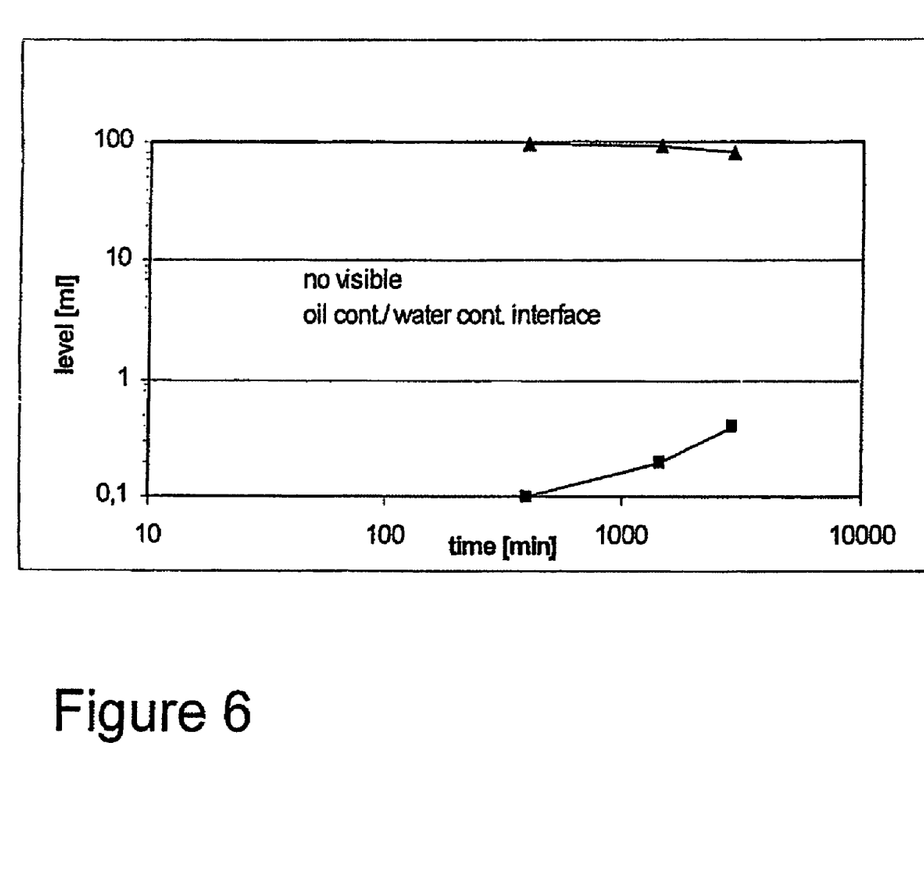
FIG. 6 is a diagram showing the separation effect of a conventional gravity separator, with the level of the separated phases shown as a function of time.

FIG. 6 shows the results of some experiments with a very stable water-oil emulsion containing 10% water. The emulsion is allowed to settle by gravity in a tank. The line with square points in FIG. 6 shows the position of the interface between the water or water continuous phase and the emulsion, while the line with triangular points shows the corresponding interface between the emulsion and the oil or oil continuous phase. As the diagram shows, with a mixture containing 10% water, no separation is observed for the first five hours. The separation continues very slowly from then on, and no visible interface between the oil continuous and water continuous phase is observed.

Figure 7:
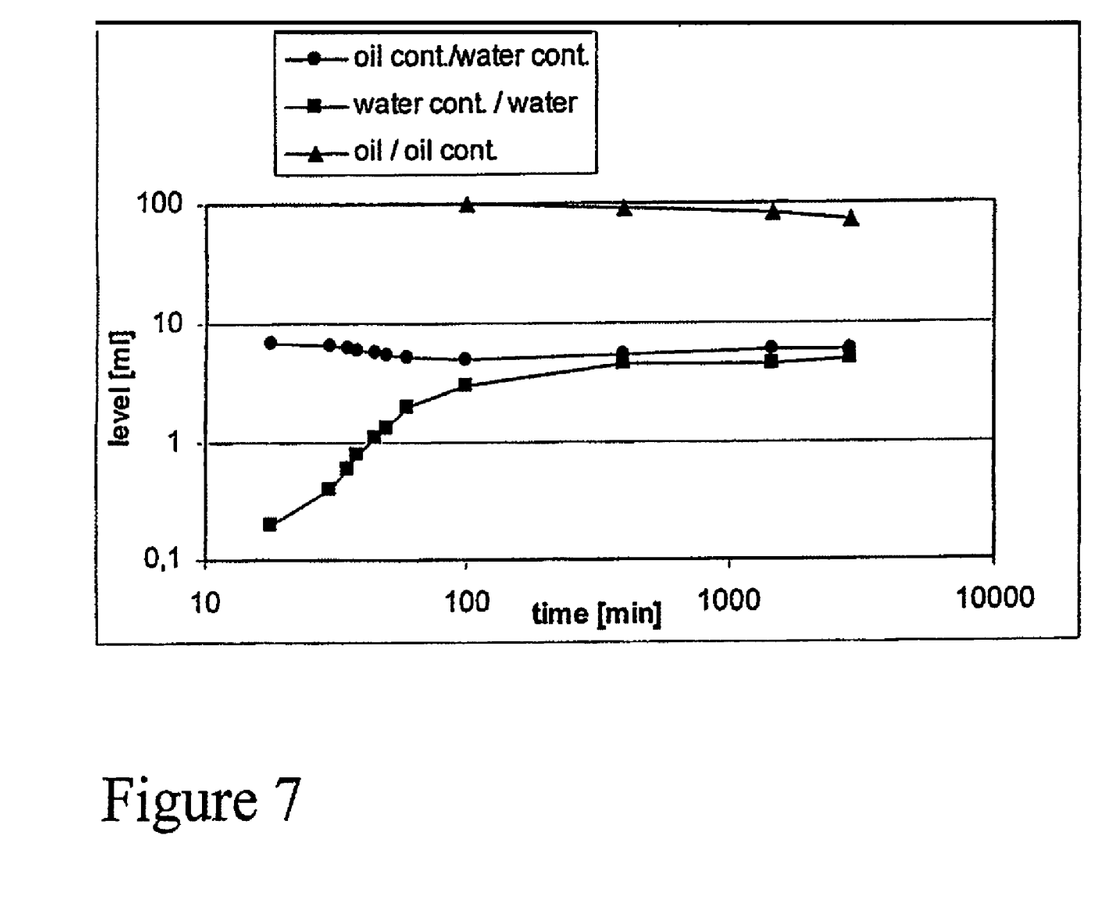
FIG. 7 shows a similar diagram after the installation of a device according to the present invention.

FIG. 7 shows the results after the introduction of the inventive device in the settling tank. In the example, the retention time in the combined coalescer and flow straightener device is about four seconds. As can be seen from the figure, a pronounced interface between the oil continuous and water continuous phases is obtained, as indicated by the line with circular points, and the separation process is almost completed after about one hour. The reader should be aware of that this is a laboratory set-up in a small scale, which is why the observed settling times do not correspond to the times mentioned earlier for a full scale production facility.

For a conventional flow straightener in a settling tank it is advantageous that the fluids obtain a significant level of turbulence to promote droplet collision rate and thereby coalescence, and provide sufficient shear forces to break down any dense emulsion layer. This is normally obtained by an evenly distributed pressure loss throughout the entire cross section area of the tank. This also promotes the desired plug flow pattern in the settling tank.

In a device according to the invention, the turbulence may be increased by restricting the flow area at the inlet of each channel, or by any other method, as well known by the artisan.

The tubular channels can also be arranged inclined downwards in the direction of flow. This promotes a self-cleaning effect, to avoid particles such as sand carried by the fluids being sedimented in the channels and possible clogging them.

Figure 8:
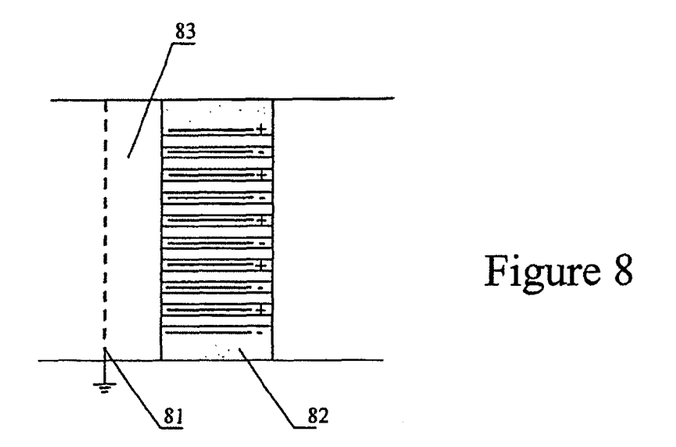
FIG. 8 shows an embodiment in which the inventive device includes an additional perforated plate mounted upstream of the matrix of coalescer elements.

An arrangement employing the present invention is shown in FIG. 8. A coalescer device 82 is mounted near the inlet of a gravity separator tank. An additional perforated metal plate 81 is mounted upstream of the coalescing device 82. The plate is connected to ground (i.e. the body of the tank), or more correctly to the mean value of the potentials U+ and U− applied to the coalescer electrodes. This arrangement creates multiple inhomogenous electric fields in the area 83 between the edges of the electrodes and the perforated plate, which significantly extends the active zone of the coalescing device. The plate will also act to distribute and homogenise the flow over the cross section of the tank.

Figure 9:
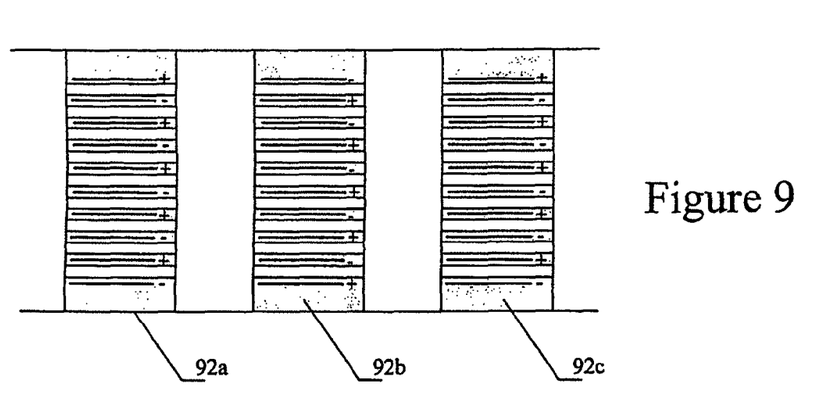
FIG. 9 shows an arrangement in which several devices according to the present invention are mounted in series.

In FIG. 9 is shown another arrangement involving the invention. In a gravity separator tank, coalescing devices 92a, 92b, 92c are arranged in series in the flow direction. In the subsequently arranged devices 92a, 92b, 92c, coalescer electrodes at the same vertical position are connected to opposite polarity. This acts to create highly inhomogenous electric fields in the area between the subsequently arranged devices, which extends the active zone of the coalescer device.

Since the invention is particularly applicable for emulsions comprising oil and water, it has been described with reference to such an application. However, it should be understood that the invention is applicable to all kinds of applications in which there is possible to ensure a proper plug flow of fluids in an emulsion and at the same time coalesce a first polar fluid emulsified in a second nonpolar fluid by means of an electric field applied to the emulsion.

The invention claimed is:

1. A device, located in a vessel having an inlet and at least one outlet, through which a mixture of fluids flows, for promoting electrostatic coalescence of a first conductive fluid emulsified in a second fluid, the device comprising:

a plurality of tubular electrostatic coalescer elements extending in a flow direction, each coalescer element comprising an insulating tubular channel through which the mixture of fluids is to flow, and each coalescer element further comprising a pair of interacting external electrodes arranged outside and adjacent to the insulating tubular channel, the interacting pair of electrodes have opposite polarity, are separated by a gap, extend in parallel in the length direction of said channel and are electrically insulated from fluids outside of the channel, wherein the plurality of coalescer elements are arranged in a matrix of coalescer elements over a cross sectional area of said vessel such that the tubular channels are parallel to each other, wherein the matrix of coalescer elements forms at least one molded coalescer module, wherein the plurality of coalescer elements are configured to operate simultaneously as a coalescer and a flow straightener, and wherein said at least one coalescer module comprises a complete transformer molded into the molded coalescer module, and wherein said transformer comprises a primary low voltage winding terminal accessible from outside of the coalescer module and a high voltage secondary winding insulated from the mixture of fluids.

2. The device according to claim 1, wherein the electrodes comprise elongated plates that are common for all coalescer elements in a row of the matrix, and shared between adjacent rows.

3. The device according to claim 1, wherein the device includes a central module being supplied by voltage, wherein the matrix of the coalescer elements is arranged in a plurality of coalescer modules, mounted on opposite sides and adjacent to said central module, and wherein electric energy being transferred by an inductive coupling from the central module to the electrodes of the coalescer modules.

4. The device according to claim 3, wherein the central module includes a plurality of primary transformer windings and half cores, wherein each of said coalescer modules includes a corresponding secondary transformer winding and a half core, and wherein the half cores in the coalescer modules and in the central module inductively complete a magnetic circuit allowing electrical energy to be transferred to the electrodes.

5. The device according to claim 4, wherein the secondary winding and the coalescer elements for each module are molded in an insulating material, forming integrated modules.

6. The device according to claim 1, wherein the device includes a central module being supplied by voltage, wherein the matrix of coalescer elements are arranged in a plurality of coalescer modules, mounted on opposite sides and adjacent to said central module, and wherein electric energy is transferred by a capacitive coupling from the central module to the electrodes of the coalescer modules.

7. The device according to claim 6, wherein the central module includes a plurality of primary capacitor plates, wherein each of said coalescer modules includes corresponding secondary capacitor plates, wherein the plates in the coalescer modules and in the central module are mounted adjacent to each other and separated by an insulating layer, and wherein the plates complete a capacitive coupling allowing electrical energy to be transferred to the electrodes.

8. The device according to claim 7, wherein the secondary capacitor plates and the coalescer elements for each module are molded in an insulating material, forming integrated modules.

9. The device according to claim 1, wherein the tubular channels are 5-30 mm in diameter and 100-500 mm long.

10. The device according to claim 9, wherein channels are inclined downwards in the flow direction.

11. The device according to claim 1, further comprising
a perforated metal plate mounted upstream of the matrix of coalescer elements and covering substantially the entire cross section of the vessel.

12. The device according to claim 11, wherein said plate is grounded to the separator vessel.

13. An arrangement for promoting electrostatic coalescence of a first conductive fluid emulsified in a second fluid flowing through a vessel comprising an inlet and at least one outlet, comprising:
at least two devices arranged in series in the flow direction, each device comprising a plurality of parallel tubular electrostatic coalescer elements extending in a flow direction, each coalescer element comprising an insulating tubular channel through which the fluids are to flow, and each coalescer element further comprising a pair of external electrodes arranged outside of and adjacent to the insulating tubular channel, the pair of electrodes having opposite polarity and electrically insulated from fluids outside of the channels, wherein said interacting pair of electrodes have opposite polarity are separated by a gap and extend in parallel in the length direction of said channel, wherein the plurality of coalescer elements are arranged in a matrix of coalescer elements over a cross sectional area of said vessel such that the tubular channels are parallel to each other, wherein the matrix of coalescer elements forms at least one molded coalescer module, wherein the pluarality of coalescer elements are configured to operate simultaneously as a coalescer and a flow straightener, wherein external electrodes at a same vertical position in two adjacent arranged devices are of opposite polarity, and wherein said at least one coalescer module comprises a complete transformer molded into the molded coalescer module, and wherein said transformer comprises a primary low voltage winding terminal accessible from outside of the coalescer module and a high voltage secondary winding insulated from the mixture of fluids.

14. An arrangement for promoting electrostatic coalescence of a first conductive fluid emulsified in a second fluid flowing through a vessel comprising an inlet and at least one outlet, comprising:
at least two devices arranged in series in the flow direction, each device comprising a plurality of parallel tubular electrostatic coalescer elements extending in a flow direction, each coalescer element comprising an insulating tubular channel through which the fluids are to flow, each coalescer element further comprising a pair of interacting pair of external electrodes arranged outside of and parallel to the insulating tubular channel, the interacting pair of electrodes having opposite polarity, are separated by a gap, extend in parallel in the length direction of said insulating tubular channel, and are electrically insulated from fluids outside of the channels, wherein the coalescer elements are arranged in a matrix over a cross sectional area of said vessel such that the tubular channels are parallel to each other, wherein the matrix forms at least one molded coalescer module, and wherein the coalescer elements are configured to operate simultaneously as a coalescer and a flow straightener, wherein external electrodes at a same vertical position in two adjacent arranged devices are of a same polarity, and wherein said at least one coalescer module comprises a complete transformer molded into the molded coalescer module, and wherein said transformer comprises a primary low voltage winding terminal accessible from outside of the coalescer module and a high voltage secondary winding insulated from the mixture of fluids.

* * * * *